(12) United States Patent
Law et al.

(10) Patent No.: US 9,043,227 B2
(45) Date of Patent: May 26, 2015

(54) VIEWING SHOPPING INFORMATION ON A NETWORK BASED SOCIAL PLATFORM

(71) Applicant: eBay Inc., San Jose, CA (US)

(72) Inventors: Philip Law, San Jose, CA (US); Yuan Der Ho, San Mateo, CA (US); Choon Chong, San Francisco, CA (US); Rolf Skyberg, Campbell, CA (US); Massimiliano Mancini, San Jose, CA (US); Adam Trachtenberg, San Francisco, CA (US); Trisha Lee Okubo, San Jose, CA (US)

(73) Assignee: eBay Inc., San Jose, CA (US)

(*) Notice: Subject to any disclaimer, the term of this patent is extended or adjusted under 35 U.S.C. 154(b) by 73 days.

(21) Appl. No.: 13/858,495

(22) Filed: Apr. 8, 2013

(65) Prior Publication Data
US 2013/0226732 A1    Aug. 29, 2013

Related U.S. Application Data

(63) Continuation of application No. 13/033,354, filed on Feb. 23, 2011, now Pat. No. 8,417,577, which is a continuation of application No. 11/963,426, filed on Dec. 21, 2007, now Pat. No. 7,945,482.

(60) Provisional application No. 60/957,645, filed on Aug. 23, 2007.

(51) Int. Cl.
*G06Q 30/00* (2012.01)
*G06Q 30/06* (2012.01)
(Continued)

(52) U.S. Cl.
CPC ............ *G06Q 30/0633* (2013.01); *G06Q 30/02* (2013.01); *G06Q 30/0601* (2013.01); *G06Q 30/0609* (2013.01); *G06Q 30/0631* (2013.01); *G06Q 30/0641* (2013.01); *G06Q 50/01* (2013.01)

(58) Field of Classification Search
CPC .......... G06Q 30/0633; G06Q 30/0631; G06Q 30/0641
USPC ................................................ 705/26.1, 27.1
See application file for complete search history.

(56) References Cited

U.S. PATENT DOCUMENTS 6,587,835 B1    7/2003   Treyz et al.
6,745,178 B1    6/2004   Emens et al.
(Continued)

FOREIGN PATENT DOCUMENTS

KR    10-1160404           6/2012
WO    WO-2009025855 A1    2/2009
WO    WO-2009025856 A1    2/2009

OTHER PUBLICATIONS

"12 Questions with Kaboodle", [Online]. Retrieved from the Internet: <URL:http://www.shmula.com/230/12-questions-with-kaboodle>, (Oct. 23 2006), 7 pgs.

(Continued)

*Primary Examiner* — Courtney Stopp
(74) *Attorney, Agent, or Firm* — Schwegman, Lundberg & Woessner, P.A.

(57) ABSTRACT

A system for viewing shopping information on a social networking platform is disclosed. At the social networking platform, the system receives a request from a user device corresponding to a first user of the social networking platform to view a list of a second user of the social networking platform. The list may include items offered for transaction on a network-based commerce server. In response to receiving the request from the user device, the system forwards the request to the network-based commerce server, and then receives updated information for at least one item on the list from the network-based corner server. Then, the system communicates the updated information received from the network-based commerce server to the user device.

18 Claims, 16 Drawing Sheets

(51) Int. Cl.
G06Q 30/02 (2012.01)
G06Q 50/00 (2012.01)

(56) References Cited

U.S. PATENT DOCUMENTS

| | | | |
|---|---|---|---|
| 6,968,179 | B1 | 11/2005 | De Vries |
| 7,356,490 | B1 | 4/2008 | Jacobi et al. |
| 7,444,297 | B2 | 10/2008 | Shah |
| 7,707,122 | B2 | 4/2010 | Hull et al. |
| 7,716,089 | B1 | 5/2010 | Gavarini |
| 7,720,722 | B2 | 5/2010 | Ho et al. |
| 7,945,482 | B2 | 5/2011 | Law et al. |
| 8,001,010 | B2 | 8/2011 | Ho et al. |
| 8,417,577 | B2 | 4/2013 | Law et al. |
| 2004/0172456 | A1 | 9/2004 | Green et al. |
| 2005/0154639 | A1 | 7/2005 | Zetmeir |
| 2005/0198031 | A1 | 9/2005 | Pezaris et al. |
| 2005/0276277 | A1 | 12/2005 | Pace |
| 2006/0031869 | A1 | 2/2006 | Bruner |
| 2006/0085259 | A1 | 4/2006 | Nicholas et al. |
| 2006/0117378 | A1 | 6/2006 | Tam et al. |
| 2006/0293967 | A1 | 12/2006 | Deluca et al. |
| 2007/0106551 | A1 | 5/2007 | McGucken |
| 2007/0150359 | A1 | 6/2007 | Lim et al. |
| 2007/0156594 | A1 | 7/2007 | McGucken |
| 2007/0168216 | A1 | 7/2007 | Lemelson |
| 2007/0239552 | A1 | 10/2007 | Sundaresan |
| 2008/0040673 | A1 | 2/2008 | Zuckerberg et al. |
| 2008/0154632 | A1 | 6/2008 | Jacobi et al. |
| 2008/0189189 | A1 | 8/2008 | Morgenstern |
| 2009/0055285 | A1 | 2/2009 | Law et al. |
| 2009/0055291 | A1 | 2/2009 | Ho et al. |
| 2009/0055292 | A1 | 2/2009 | Chong et al. |
| 2009/0265253 | A1 | 10/2009 | Gabriel et al. |
| 2010/0205066 | A1 | 8/2010 | Ho et al. |
| 2011/0145105 | A1 | 6/2011 | Law et al. |
| 2011/0264556 | A1 | 10/2011 | Ho et al. |
| 2011/0264557 | A1 | 10/2011 | Ho et al. |

OTHER PUBLICATIONS

U.S. Appl. No. 11/963,399, Final Office Action mailed Aug. 24, 2009, 25 pgs.
U.S. Appl. No. 11/963,399, Non Final Office Action mailed Mar. 3, 2009, 15 pgs.
U.S. Appl. No. 11/963,399, Notice of Allowance mailed Jan. 6, 2010, 15 pgs.
U.S. Appl. No. 11/963,399, Response filed Jun. 3, 2009 to Non Final Office Action mailed Mar. 3, 2009, 18 pgs.
U.S. Appl. No. 11/963,399, Response filed Oct. 27, 2009 to Final Office Action mailed Aug. 24, 2009, 10 pgs.
U.S. Appl. No. 11/963,426, Examiner Interview Summary mailed Nov. 25, 2009, 3 pgs.
U.S. Appl. No. 11/963,426, Final Office Action mailed May 13, 2010, 15 pgs.
U.S. Appl. No. 11/963,426, Non Final Office Action mailed Mar. 3, 2009, 15 pgs.
U.S. Appl. No. 11/963,426, Non Final Office Action mailed Aug. 27, 2009, 26 pgs.
U.S. Appl. No. 11/963,426, Notice of Allowance mailed Nov. 15, 2010, 15 pgs.
U.S. Appl. No. 11/963,426, Preliminary Amendment filed Mar. 21, 2008, 3 pgs.
U.S. Appl. No. 11/963,426, Response filed Jun. 3, 2009 to Non Final Office Action mailed Mar. 3, 2009, 13 pgs.
U.S. Appl. No. 11/963,426, Response filed Oct. 13, 2010 to Final Office Action mailed May 13, 2010, 10 pgs.
U.S. Appl. No. 11/963,426, Response filed Nov. 25, 2009 to Non Final Office Action mailed Aug. 27, 2009, 10 pgs.
U.S. Appl. No. 12/767,666, Examiner Interview Summary mailed Jun. 13, 2011, 2 pgs.
U.S. Appl. No. 12/767,666, Non Final Office Action mailed Dec. 8, 2010, 10 pgs.
U.S. Appl. No. 12/767,666, Notice of Allowance mailed Jun. 13, 2011, 14 pgs.
U.S. Appl. No. 12/767,666, Response filed Mar. 8, 2011 to Non-Final Office Action mailed Dec. 8, 2010, 11 pgs.
U.S. Appl. No. 13/033,354, Final Office Action mailed May 24, 2012, 17 pgs.
U.S. Appl. No. 13/033,354, Non Final Office Action mailed Dec. 7, 2011, 13 pgs.
U.S. Appl. No. 13/033,354, Notice of Allowance mailed Dec. 11, 2012, 8 pgs.
U.S. Appl. No. 13/033,354, Response filed Feb. 24, 2012 to Non Final Office Action mailed Dec. 7, 2011, 10 pgs.
U.S. Appl. No. 13/033,354, Response filed Oct. 24, 2012 to Final Office Action mailed May 24, 2012, 12 pgs.
U.S. Appl. No. 13/033,354, Supplemental Notice of Allowability mailed Jan. 15, 2013, 3 pgs.
U.S. Appl. No. 13/177,336, Final Office Action mailed Jun. 21, 2012, 12 pgs.
U.S. Appl. No. 13/177,336, Non Final Office Action mailed Jan. 19, 2012, 13 pgs.
U.S. Appl. No. 13/177,336, Notice of Allowance mailed Oct. 3, 2012, 8 pgs.
U.S. Appl. No. 13/177,336, Response filed Apr. 13, 2012 to Non Final Office Action mailed Jan. 19, 2012, 9 pgs.
U.S. Appl. No. 13/177,341, Final Office Action mailed May 18, 2012, 14 pgs.
U.S. Appl. No. 13/177,341, Non Final Office Action mailed Jan. 12, 2012, 13 pgs.
U.S. Appl. No. 13/177,341, Notice of Allowance mailed Oct. 9, 2012, 13 pgs.
U.S. Appl. No. 13/177,341, Response filed Aug. 20, 2012 to Non Final Office Action mailed May 18, 2012, 11 pgs.
U.S. Appl. No. 13/177,341, Response filled Apr. 12, 2012 to Non Final Office Action mailed Jan. 12, 2012, 10 pgs.
"Buy.com, Facebook Team up to Compete with eBay", The A.P., Charleston Daily Mail. Retrieved from Proquest Sep. 21, 2012, (Aug. 7, 2007), 1 pg.
"FAQ section of kaboodle.com", [Online]. [Archived Aug. 13m 2006]. Retrieved from the Internet: <URL: http://web.archive.org/web/20060813110112/http://www.kaboodle.con/zd/help/faq.html>, (Aug. 13, 2006), 7 pgs.
"International Application Serial No. PCT/US2008/010003, International Preliminary Report on Patentability mailed Mar. 4, 2010", 7 pgs.
"International Application Serial No. PCT/US2008/010003, Search Report mailed Nov. 12, 2008", 4 pgs.
"International Application Serial No. PCT/US2008/010003, Written Opinion mailed Nov. 12, 2008", 4 pgs.
"International Application Serial No. PCT/US2008/010004, International Preliminary Report on Patentability mailed Mar. 4, 2010", 8 pgs.
"International Application Serial No. PCT/US2008/10004, International Search Report mailed Nov. 10, 2008", 5 pgs.
"International Application Serial No. PCT/US2008/10004, International Written Opinion mailed Nov. 10, 2008", 5 pgs.
"Kabodle.com: Get Started with Kaboodle", [Online]. [Archived Aug. 13, 2006]. Retrieved from the Internet: <URL: http://web.archive.org/web/20060813094114/www.kaboodle.com/zd/help/getStarted.html>, (Aug. 13, 2006), 10 pgs.
"Kaboodle Delivers eBay's New "My Collectibles" Destination", [Online]. Retrieved from the Internet: <URL: http://www.kaboodle.com/zm/pr3>, (Jun. 12, 2006), 2 pgs.
"Korean Application Serial No. 2010-7006376 Office Action filed Oct. 14, 2011", with English translation of claims, 8 pgs.
"Korean Application Serial No. 2010-7006376, Response filed Dec. 14, 2011 to Office Action mailed Oct. 14, 2011", with English translation of claims, 32 pgs.
"The archived step-by-step Guide to Using Kaboodle section of the Kaboodle website dated Nov. 25, 2005", www.archive.org, (Aug. 19, 2009).

VIEWING SHOPPING INFORMATION ON A NETWORK BASED SOCIAL PLATFORM

RELATED APPLICATIONS

This application is a continuation of U.S. application Ser. No. 13/033,354, filed Feb. 23, 2011, which application is a continuation of U.S. application Ser. No. 11/963,426, filed on Dec. 21, 2007, which claims the priority benefits of U.S. Provisional Application No. 60/957,645, filed Aug. 23, 2007, both of which are incorporated herein by reference in their entirety.

FIELD

Embodiments relate generally to the technical field of data communications and, in one example embodiment, to communications over a network.

BACKGROUND

Applications available on the Internet have progressed from facilitating a medium of information delivery to a venue for sales and more recently to a platform for social networking. Online market places such as Amazon.com and eBay.com are examples of online sellers. Similarly, mySpace.com and Facebook.com are examples of social networking.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

In some example embodiments, a system and method for viewing shopping information on a network-based social platform is illustrated. At a network-based social platform, a request may be received from a first user of the network-based social platform to view a list associated with a second user on the network-based social platform. The list may include one or more items and facilitate watching the items in real time on the network-based social platform to monitor the progress of an auction or an immediate purchase of the item on the network-based marketplace. For example, the list may include items for which a bid has been submitted by the second user in respective auctions on the network-based marketplace 12. Next, the system may determine whether the first user is authorized to view the list associated with the second user based on a predetermined relationship between the first and second user. For example, the predetermined relationship may have been consensually established by the first and second users on the network-based social platform and may, in some embodiments, include the relationship "friend" or "favorite friend." Further, the second user may configure a level disclosure preventing display of specific items on requested list or specific information of items on the list. Finally, the system may communicate the list of items to the first user based on the configured level of disclosure. Accordingly, in some embodiments, a first user on a network-based social platform may view shopping information concerning an item on a network-based marketplace that is being monitored on a list by a second user on the network-based social platform.

Platform Architecture

Figure 1:
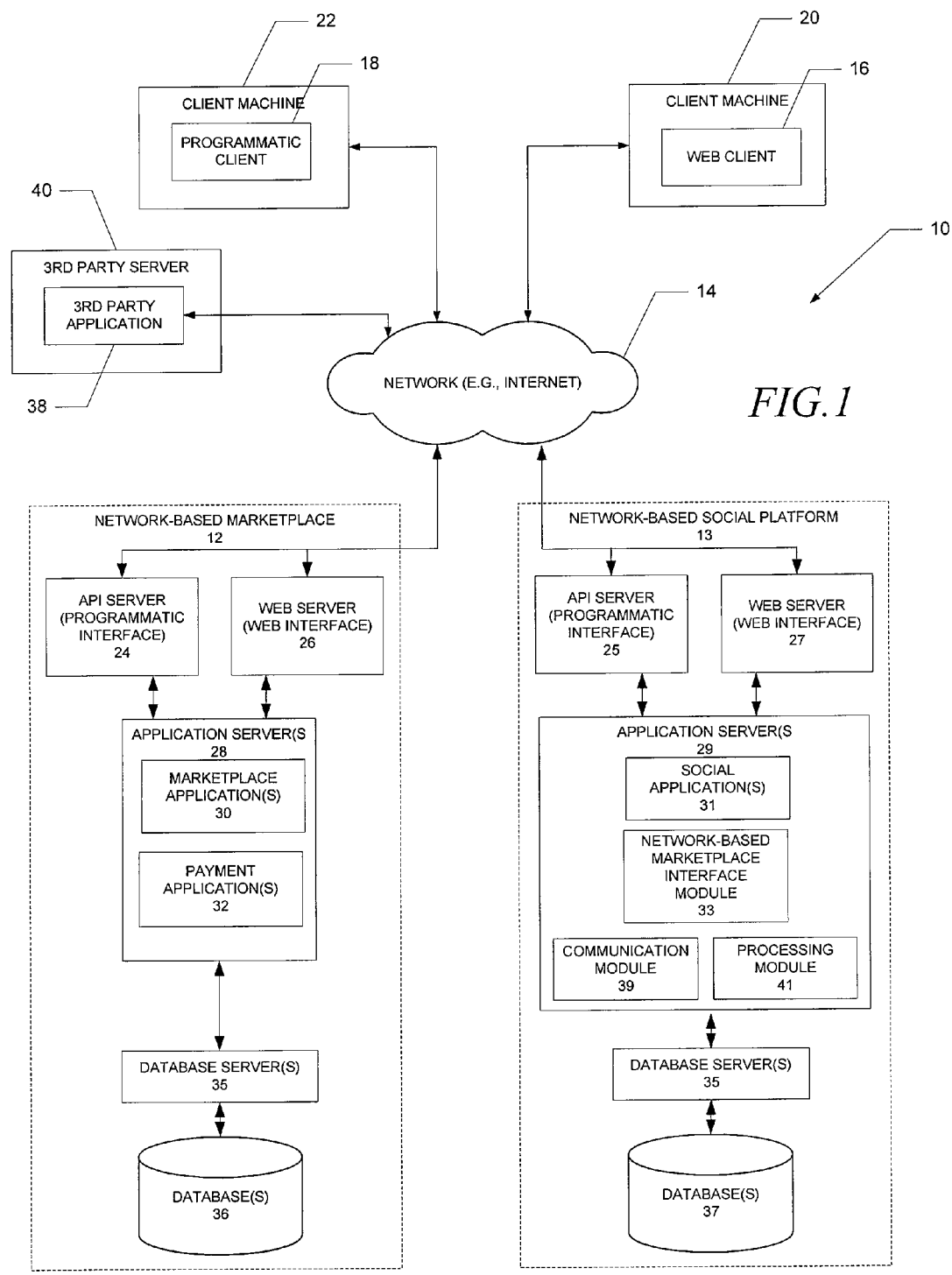
FIG. 1 is a network diagram depicting a system, according to one example embodiment, having a client-server architecture.

FIG. 1 is a network diagram depicting a system 10, according to one embodiment of the present disclosure, having a client-server and a peer-to peer architecture. The system 10 facilitates shopping activity, in the exemplary form of a network-based marketplace 12, and a network-based social platform 13 that communicate over a network 14. In one embodiment, the network-based marketplace 12 and the network-based social platform 13 communicate in peer-to peer architecture via programmatic interfaces. Further, the network-based marketplace 12 and the network-based social platform 13 respectively communicate in client-server architecture with clients. The network-based marketplace 12, provides server-side functionality, via the network 14 (e.g., the Internet), to the one or more client machines 20 and 22. Similarly, the network-based social platform 13 provides server-side functionality, via the network 14 (e.g., the Internet), to the one or more client machines 20 and 22. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based social platform 13, an application program interface (API) server 25 and a web server 27 are coupled to, and provide programmatic and web interfaces respectively to, one or more application servers 29. The application servers 29 may host one or more social applications 31 and a network-based marketplace interface module 33 that communicates with a communication module 39 and a processing module 41. The application servers 28 are, in turn, shown to be coupled to one or more databases servers 35 that facilitate access to one or more databases 37.

The social applications 31 provide a number of social networking functions and services to users that access the network-based social platform 13. For example, the social applications 31 may enable a user to store information in a profile that may be viewed at the client machines 20, 22 and to selectively grant access to information that appears on the profile to other users who may also view the profile at their client machines 20, 22. The social applications 31 may provide criteria that may be employed by a user to grant various levels of access to various levels of users. For example, a first user may access profile information associated with a second user responsive to the first user achieving the status of "friend" in relation to a second user. A user may achieve the status of friend by accepting an invitation from another user or by sending a request to a user that subsequently grants the request.

The social applications 31 may further enable third party service providers to add "applications" on the network-based social platform 13 that are utilized by users to interact with other users. For example, a network-based marketplace application may be added by a third party service provider in the form of the network-based marketplace interface module 33, the communication module 39, and the processing module 41 that may provide market application services in the network-based social platform 13 environment and may communicate with the network-based marketplace 12.

In one embodiment, a request related to the marketplace application may be generally processed as follows. The request may originate at the client machines 20, 22 that communicates the request via programmatic or web interface services 25, 27 to the social applications 31 that, in turn, communicate the request to the network-based marketplace interface module 33 that, in turn, communicates the request to the communication module 39 and processing module 41 that process the request. Conversely, the communication module 39 and processing module 41 may respond to the social applications 31 via the network-based marketplace interface module 33. In some instances processing of the request may require communication with the network-based marketplace 12. In such instances the communication module 41 may communicate via the API interface 25 with the network-based marketplace 12.

The network-based social platform 13 may be embodied as FACEBOOK® services, a social utility that connects people with friends and others who work, study and live around them provided by Facebook of Palo Alto, Calif.

The web client 16, it will be appreciated, accesses the various social applications 31 via the web interface supported by the web server 27. Similarly, the programmatic client 18 accesses the various services and functions provided by the social applications 31 via the programmatic interface provided by the API server 25.

Turning to the network-based marketplace 12, an application program interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present disclosure, the payment applications 32 may form part of a payment service that is separate and distinct from the marketplace 12. The network-based marketplace 12 may be embodied as eBAY, the worlds online marketplace, provided by eBay of San Jose, Calif.

Further, while the system 10 shown in FIG. 1 employs a client-server architecture and a peer-to-peer architecture, the present disclosure is of course not limited to such an architecture, and could equally well find application in any combination of client-server, distributed, or peer-to-peer, architecture systems. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings of items on the marketplace 12 in an off-line manner, and to perform batch-mode communications between the programmatic client 18 and the network-based marketplace 12.

It will be appreciated that the marketplace applications 30, payment applications 32, social applications 31, the network-based marketplace interface module 33, the communication module 39 and the processing module 41 may execute on a single platform. Accordingly, in one embodiment, the aforementioned applications/modules may execute on the network-based marketplace 12 and in another embodiment the aforementioned applications/module may execute on the network-based social platform 13.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Social Platform Applications

Figure 2:
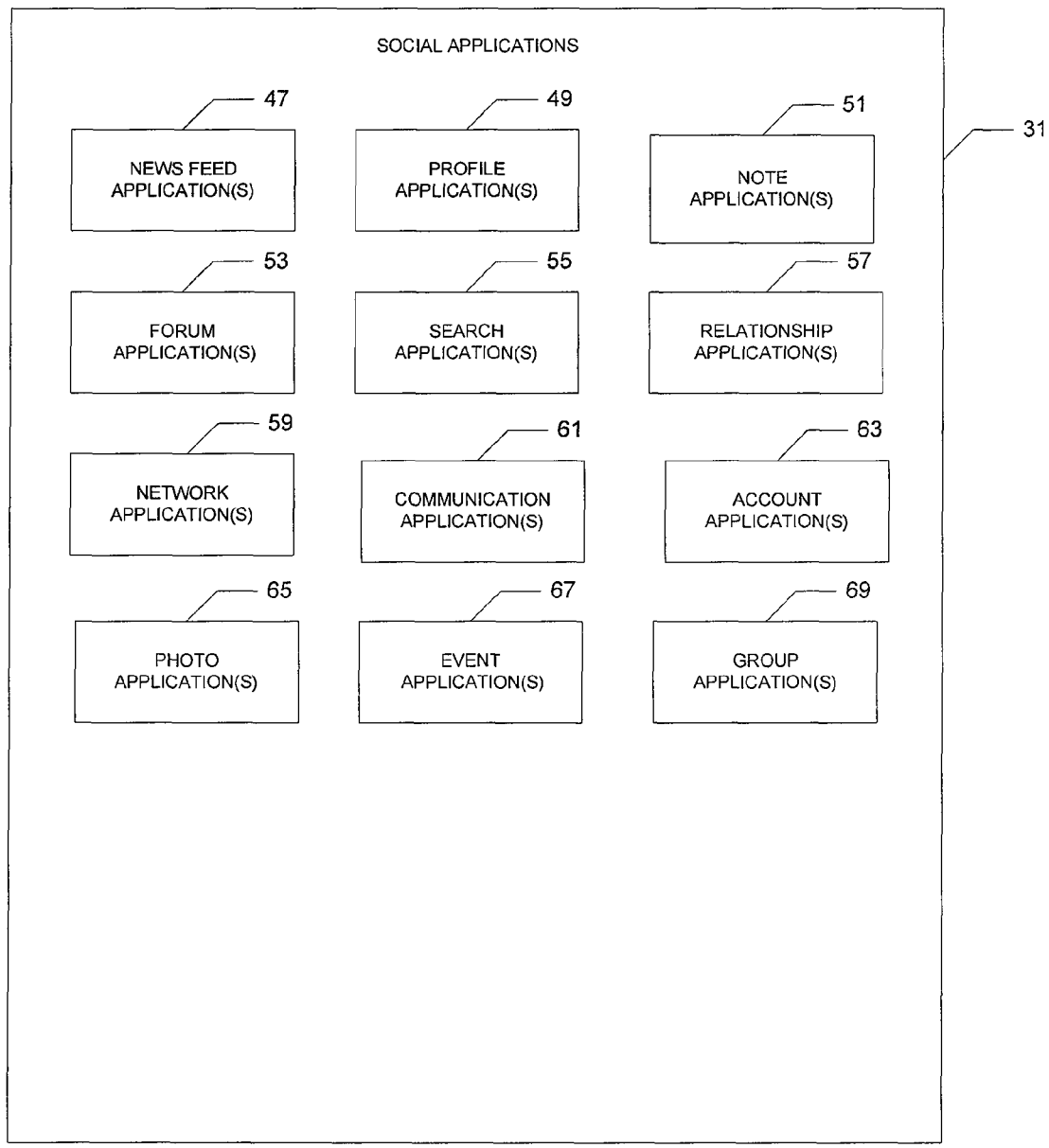
FIG. 2 is a block diagram illustrating social applications, according to an embodiment.

FIG. 2 is a block diagram illustrating social applications 31 that execute on the network-based social platform 13, according to an embodiment. The social applications 31 include news feed applications 47, profile applications 49, note applications 51, forum applications 53, search applications 55, relationship applications 57, network applications 59, communication applications 61, account applications 63, photo applications 65, event applications 67 and group applications 69.

The news feed applications 47 publish events associated with the user and friends of the user on the network-based social platform 13. The news feed applications 47 may publish the events on the user profile of a user. For example, the news feed applications 47 may publish the uploading of a photo album by one user on the user profile the user and the user profiles of friends of the user.

The profile applications 49 may maintain user profiles for each of the users on the network-based social platform 13. Further, the profile applications 49 may enable a user to restrict access to selected parts of their profile to prevent viewing by other users. The notes applications 51 may be used to author notes that may be published on various user interfaces.

The forum applications 53 may maintain a forum for users to post comments and display the forum via the profile associated with a user. The user may add comments to the forum, remove comments from the forum and restrict visibility to other users. In addition, other users may post comments to the forum. The search applications 55 may enable a user to perform a keyword search for users, groups, and events. In addition, the search applications 55 may enable a user to search for content (e.g. favorite movies) on profiles accessible to the user.

The relationship applications 57 may maintain relationship information for the users. The network applications 59 may facilitate the addition of social networks by a user, the social networks based on a school, workplace, or region or any social construct for which the user may prove an affiliation. The communication applications 61 may process incoming and outgoing messages, maintain an inbox for each user, facilitate sharing of content, facilitate interaction among friends (e.g., poking), process requests, process events, process group invitations and process communicating notifications.

The account applications 63 may provide services to facilitate registering, updating, and deleting user accounts. The photo applications 65 may provide services to upload photographs, arrange photographs, set privacy options for albums and tag photographs with text strings. The event applications 67 provides services to create events, review upcoming events, and review past events. The group applications 69 may be used to maintain group information, display group information, and navigate to groups.

Figure 3:
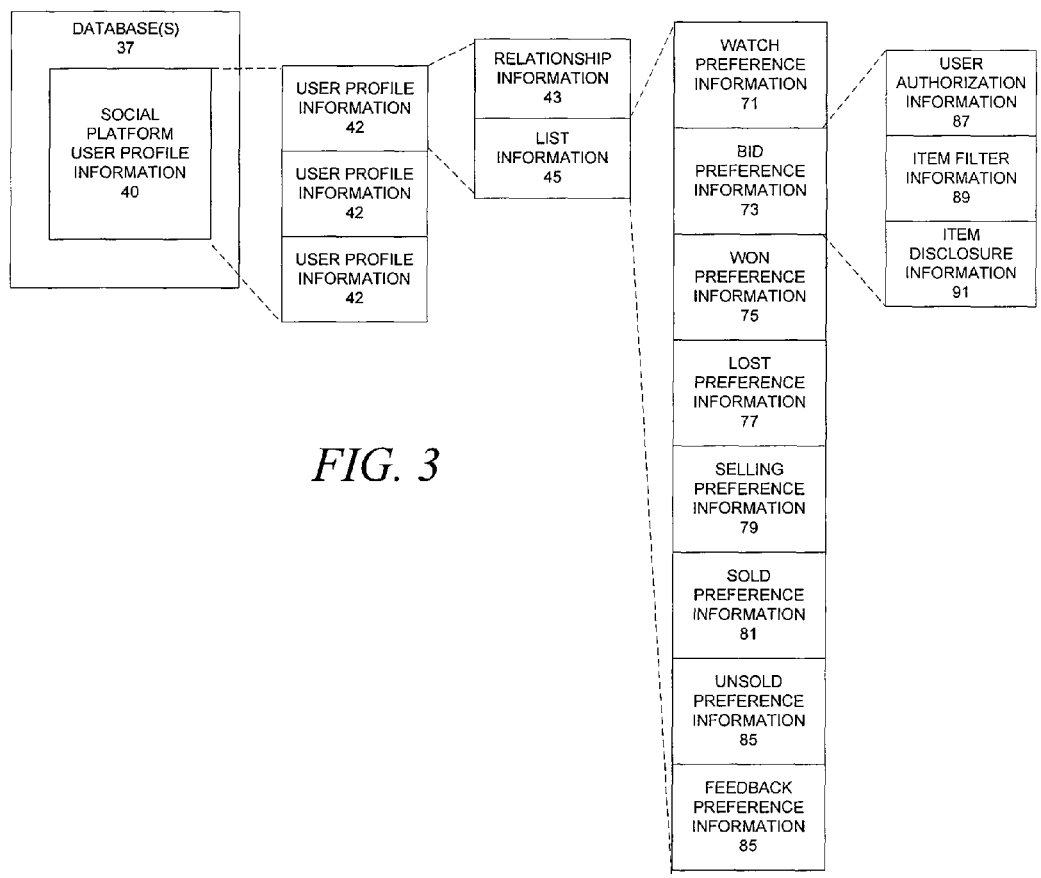
FIG. 3 is a block diagram illustrating a database, according to an embodiment.

FIG. 3 is a block diagram illustrating a database 37, according to an embodiment, at a network-based social platform 13. The database 37 is shown to store user profile information 42 for each user on the network-based social platform 13. The user profile information 42 may store relationship information 43 and list information 45. The relationship information 43 may store predetermined relationships between the identified user and other users on the network-based social platform 13. For example, a first user may be related to second user on the network-based social platform 13 as a "marketplace community member" or "friend," or "favourite friend." etc. The respective designations, "marketplace community member," "friend," and "favourite friend" may correspond to an increasing levels of disclosure.

The list information 45 may store disclosure preferences of a user for each of the lists owned and controlled by the user, as discussed further later. The watch preference information 71 may be associated with disclosure of listings of items on a watch list. The watch list may include items that the user desires to watch. For example, the user may be interested in a book (e.g., item) that is currently being auctioned.

The bid preference information 73 may be associated with disclosure of listings for items on a bid list. The bid list may include items for which the user has entered a bid.

The won preference information 75 may be associated with disclosure of listings for items on a won list. The won list may include items that have been won by the user in an auction.

The selling preference information 79 may be associated with disclosure of listings of items that are on a selling list. The selling list may include items being offered for sale or auction by the user.

The sold preference information 81 may be associated with disclosure of listings of items that are on a sold list. The sold list may include items that were offered for sale or auction by the user and subsequently sold.

The unsold preference information 83 may be associated with disclosure of listings of items on an unsold list. The unsold list may include items that were offered for sale or auction by the user and not sold.

The feedback preference information 85 may be associated with disclosure of feedback records that identify items. The feedback may identify items transacted on the network based marketplace 12 and include comments and ratings.

The user authorization information 87 may store the preference of a user for disclosure of item information for listings of items on each of the respective lists. Specifically, the user may prefer to disclose a minimum amount of item information, a maximum amount of item information, or not disclose item information for an item that is configured according to predetermined relationships including a "marketplace community member", a "friend", and a "favourite friend." A "marketplace community member" may be a user on the network-based social platform 13 that has added the marketplace application but is not a "friend" or a "favourite friend" of the user.

The item filter information 89 may be used to store the preference of a user for disclosing or not disclosing items for each of the respective lists. For example, the user may disclose items within a specific price range (e.g., 0-$0.99, $1.00-$9.99, $10.00-$99.00, etc.). Further for example, the user may disclose items categorized within a specific category (e.g., toys, books, automobiles). With regard to feedback preference information 85, the user may elect to disclose feedback associated with items within a specific price range and/or category.

The item disclosure information 91 may be used to store the preference of a user regarding the quantity of item information that is disclosed for a specific item on a list. Configurable parameters may include a summary disclosure parameter and a disclosure teaser parameter. Selection of the summary disclosure parameter may cause a maximum of item information to be displayed. For example, a photograph and text may appear with the item on a list. Selection of the teaser disclosure parameter may cause limited item information to be displayed. For example, disclosure may be limited to a photograph, graphic, or picture without the associated text. One advantage of limiting disclosure may be to prevent competitive bidding on an item. Of course "friends" may consent to disclosure of such information, as described herein.

Other embodiments may enable selection of the above described parameters according to other identified groups of users (e.g., friends living in San Jose, etc.). Yet other embodiments may enable selection according other groups of listings. Yet other embodiments may enable selection of the above described options according combinations of identified groups of users and identified groups of listings.

Marketplace and Payment Applications

Figure 4:
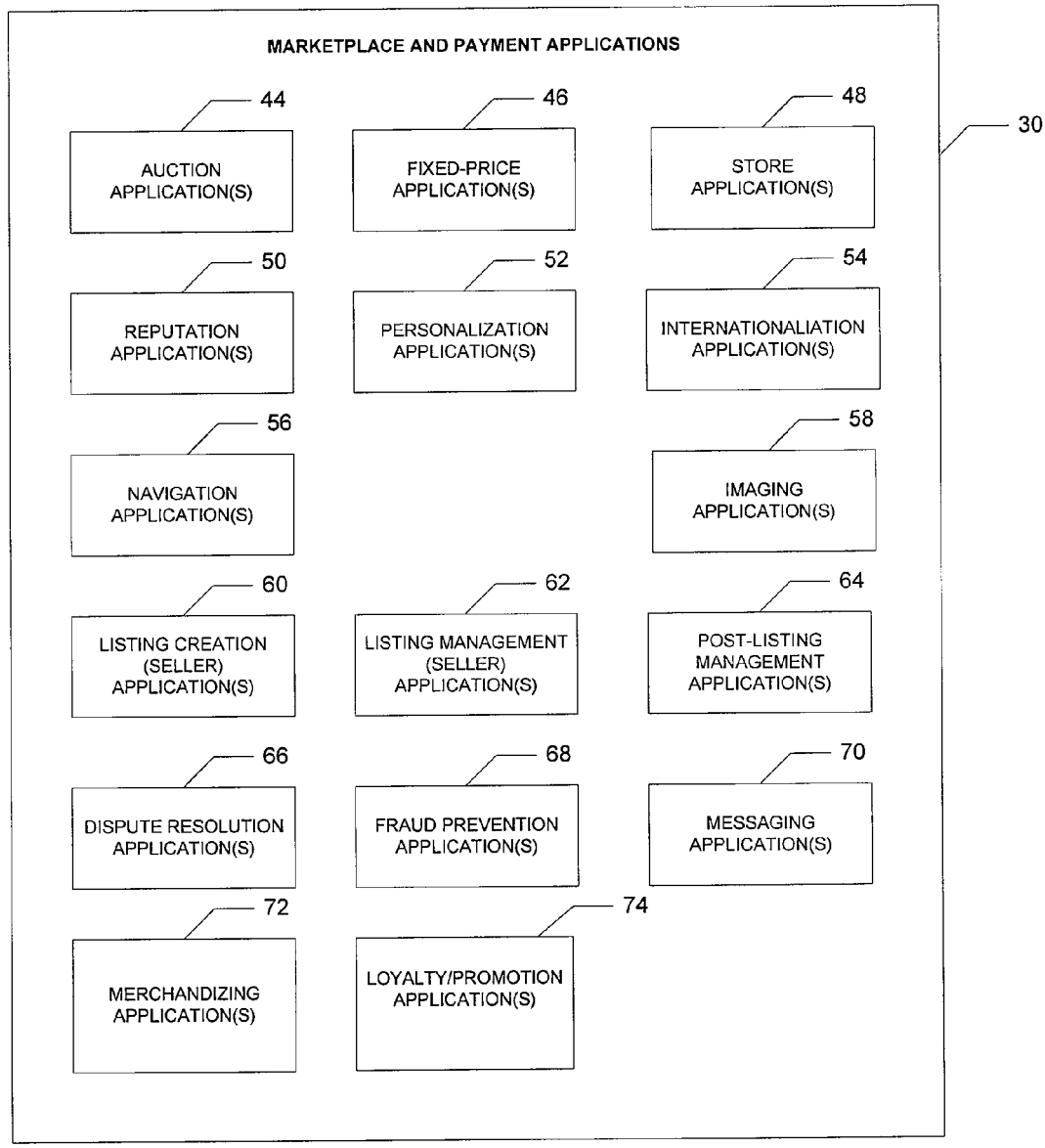
FIG. 4 is a block diagram illustrating marketplace and payment applications, according to an embodiment.

FIG. 4 is a block diagram illustrating multiple marketplace and payment applications 30, 32 that, in one exemplary embodiment of the present disclosure, are provided as part of the network-based marketplace 12. The marketplace 12 may provide a number of listing and price-setting mechanisms whereby a seller may list goods or services (e.g., items) for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized 54) presentations of a common underlying marketplace.

Navigation of the network-based marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services (e.g., items) that they wish to transact via the marketplace 12, and listing management applications 62 to allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50. In addition, the post listing management applications 64 may facilitate tracking and organization of listings for a user by maintaining identified listings in lists. For example, the lists may include watch information in the form of identified items that are offered for sale on the network-based marketplace 12.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 5:
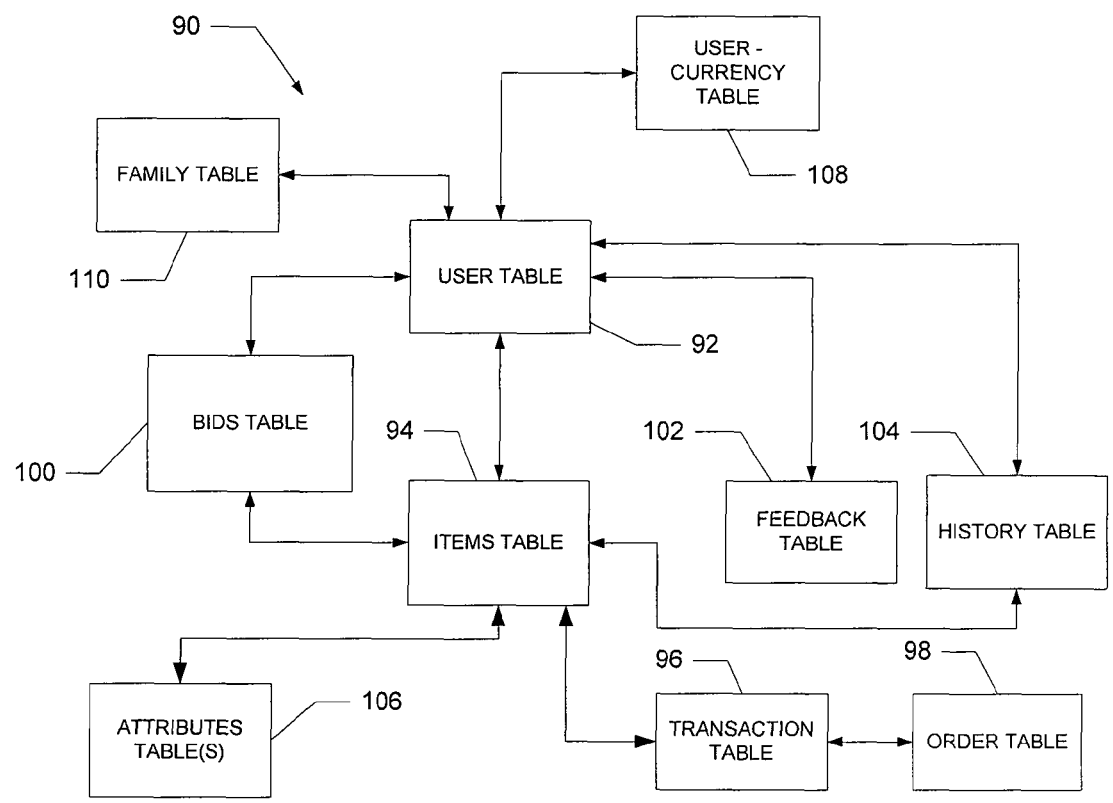
FIG. 5 is a high-level entity-relationship diagram, illustrating various tables stored on a database(s)

FIG. 5 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present disclosure, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records (e.g., item information) for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94. An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. In one embodiment, the reputation information may include feedback records associated with transactions. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 6:
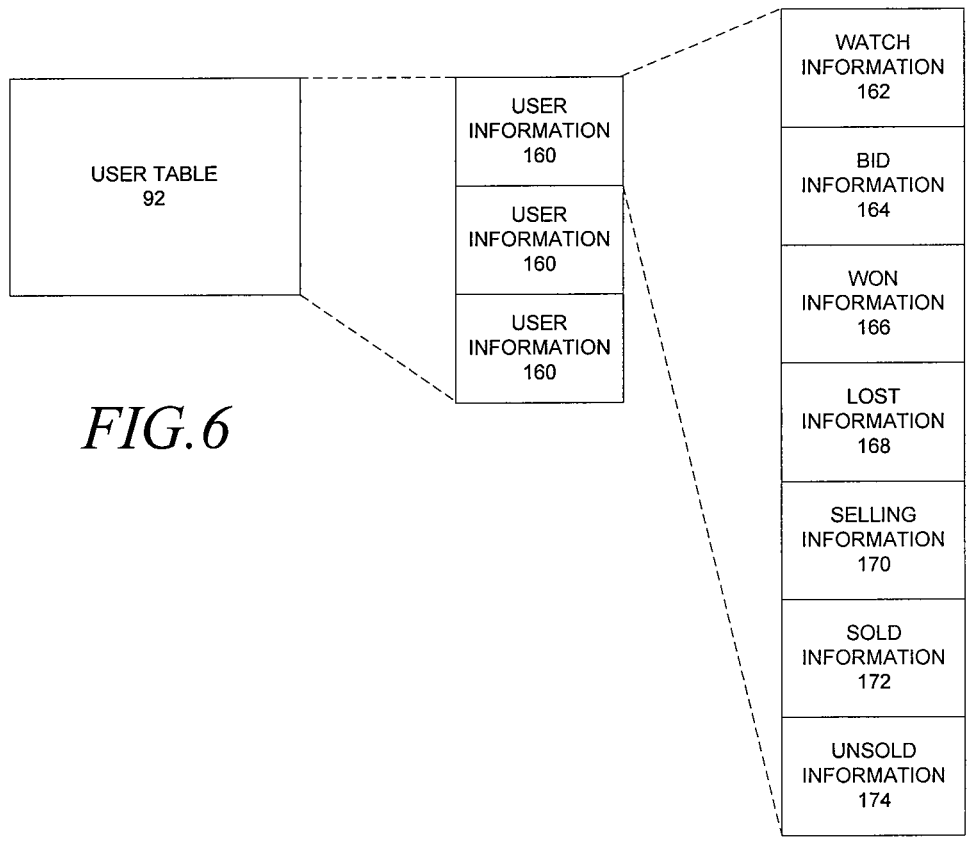
FIG. 6 is a block diagram illustrating a user table, according to an embodiment.

FIG. 6 is a block diagram illustrating a user table 92, according to an embodiment. The user table 92 includes a user information 160 for each user on the network-based marketplace 12. Each user information 160 may store watch information 162, bid information 164, won information 166, lost information 168, selling information 170, sold information 172, and unsold information 174 that respectively store item identifiers associated with items on the network-based marketplace 12 that the user monitors.

Figure 7:
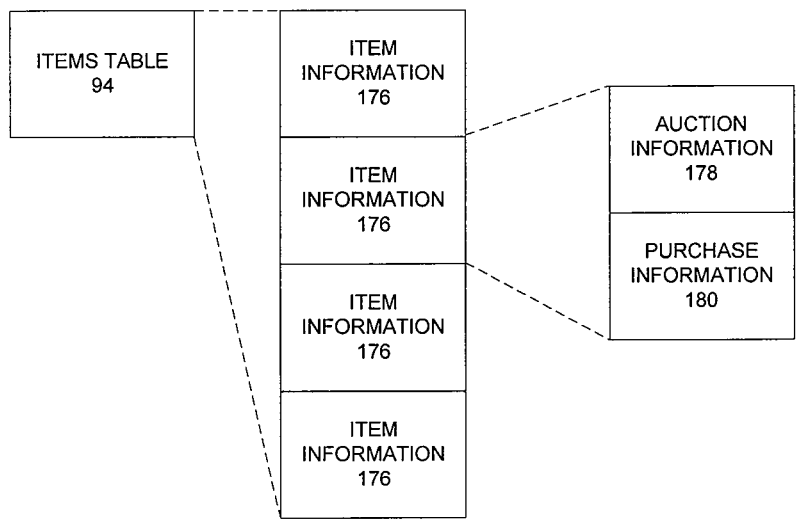
FIG. 7 is a block diagram illustrating an items table, according to an embodiment.

FIG. 7 is a block diagram illustrating an items table 94, according to an embodiment. The items table 94 stores a item information 176 (e.g., listing information) for each item on the network-based marketplace 12. For example, the item information 176 may store a title, a description, a photograph, or any other information or content descriptive of goods or services that may be offered for sale on the network-based marketplace 12. The item information 176 is specifically shown to store auction information 178 and purchase information 180. The auction information 178 may store information related to the auctioning of the item (e.g., minimum bid, current bid, highest bid, start time of auction, end time of auction, etc.). The purchase information 180 may store information related to the purchase of the item (e.g., purchase price). In one embodiment, a item offered for sale on the network-based marketplace 12 may be acquired by submitting the highest bid in an auction or by paying a predetermined purchase price.

Figure 8:
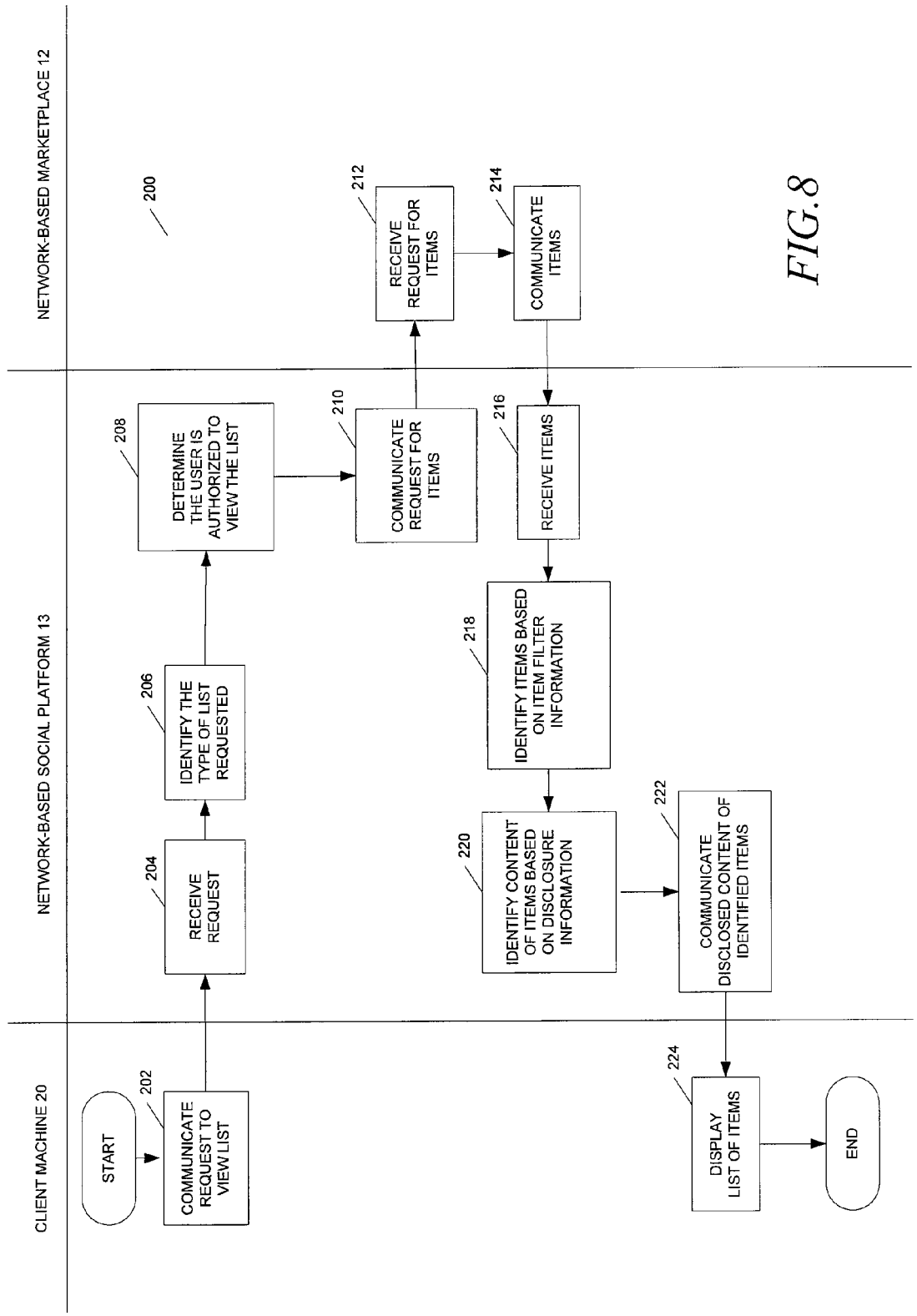
FIG. 8 is a block diagram illustrating a method, according to an embodiment, to view a list.

FIG. 8 is a block diagram illustrating a method 200, according to an embodiment, to view a list of items for sale on a network-based marketplace. Illustrated on the right may be operations performed on the network-based marketplace 12. Illustrated in the middle may be operations performed on the network-based social platform 13 and illustrated on the left may be operations performed on the client machine 20.

The method 200 may commence, at operation 202, with a first user requesting to view a list of a second user on the network-based social platform 13. Specifically, when operation 202 is executed, the client machine 20 receives the request and communicates the request to the network-based social platform 13. The requested list may include one or more listings of items that appear on a watch list, a bid list, a won list, a lost list, a selling list, a sold list an unsold list or feedback.

At operation 204, the communication module 39, at the network-based social platform 13, may receive the request and at operation 206, the processing module 41 identifies the type of list requested. For example, the first user may be requesting to view the bid list of the second user. At operation, 208, the processing module 41 determines whether the user that requested to view the list is authorized to view the list. For example, the processing module 41 may compare a predetermined relationship between the first user and the second user to preferences configured by the second user to determine a level of disclosure, if any. In an example where the second user prefers to disclose the requested list to the first user, at operation, 210, the processing module 41 communicates the request for a list of items (e.g., bid list) to the network-based marketplace 12.

At operation 212, the network-based marketplace12 may receive the request and, at operation 214, the network-based marketplace12 may communicate item information 176 for each of the items on the requested list.

At operation 216, at the network-based social platform 13, the communication module 39 receives item information 176 for the items and at operation 218 the processing module 41 identifies the items on the list to be disclosed (e.g., displayed) to the first user based on the appropriate item filter information 65. For example, the second user may prefer to disclose only items in a specific price range (e.g., $1.00-$99.00) or in a specific category (e.g., Toys).

At operation 220, the processing module 41 identifies item information 176 for each item to be disclosed to the first user. For example, the second user may prefer to disclose only a picture (e.g., teaser disclosure) of the items on the bid list. In another example, the second user may prefer to disclose a picture and text (e.g., summary disclosure). At operation, 222, the communication module 39 communicates the disclosed item information 176 of the identified items to the network-based marketplace interface module 33 that in turn, communicates the same to the social applications 31 that in turn, communicates the same to the client machine 20.

At operation 224, the client machine 20 displays the disclosed content of the identified items to the first user.

Figure 9:
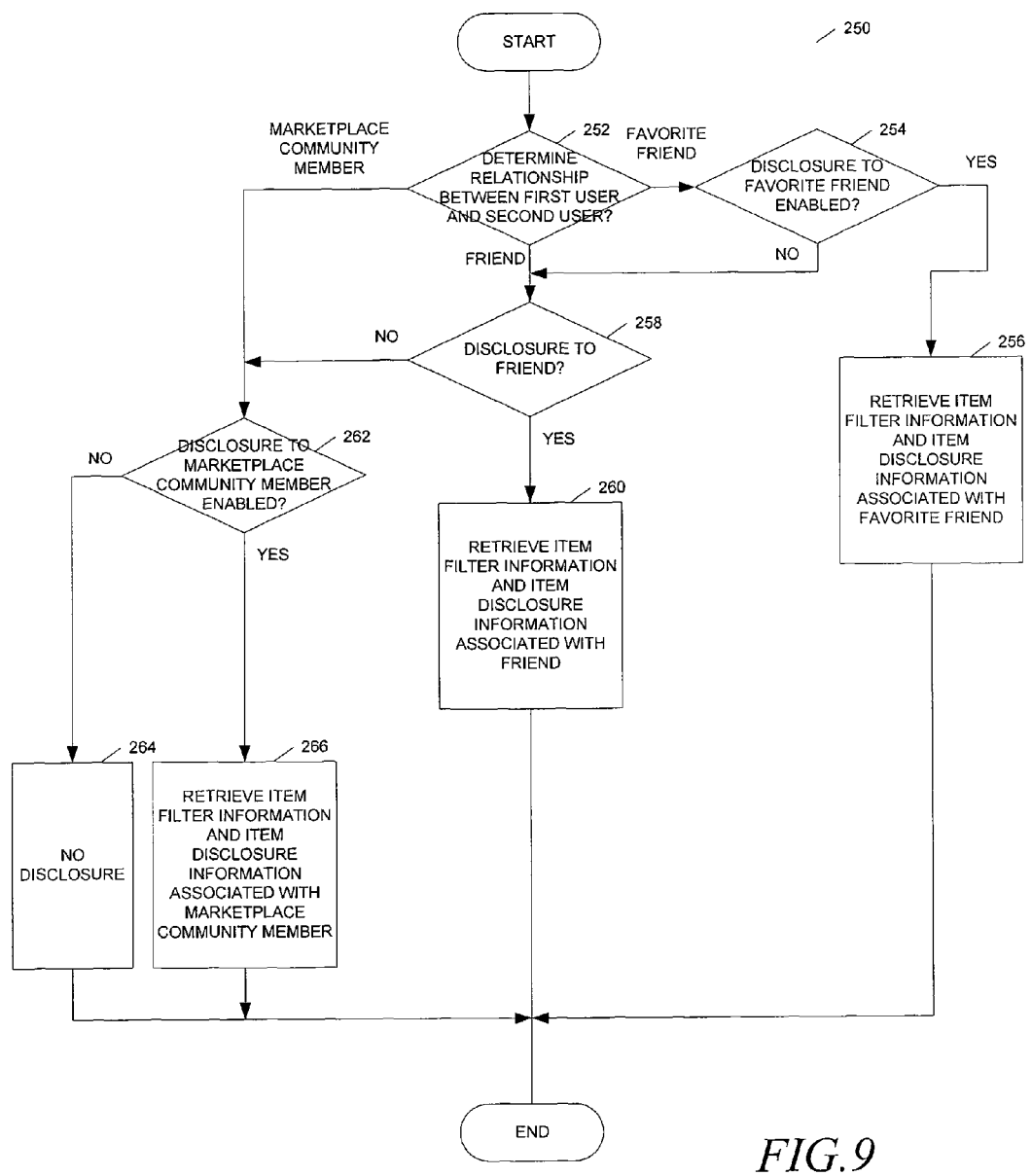
FIG. 9 is a block diagram illustrating a method, according to an embodiment, to determine whether a user is authorized to view a list.

FIG. 9 is a block diagram illustrating a method 250, according to an embodiment, to determine whether a user is authorized to view a list. The present example illustrates a first user requesting to view a bid list of a second user. The method 250 corresponds to the operation 208 on FIG. 8.

The method 250 commences at operation 252, at the network-based social platform 13, with the processing module 41 determining the relationship between a first user on a network-based social platform 13 and a second user on the network-based social platform 13. In one embodiment, the processing module 41 may use the relationship information 43 associated with the first user to identify the predetermined relationship between the first and the second user. In another embodiment, the processing module may use the relationship information 43 associated with the second user. If the predetermined relationship is determined to be a "favourite friend" then a branch is made to decision operation 254. If the predetermined relationship is determined to be a "friend" then a branch is made to decision operation 258. If the predetermined relationship is determined to be a "marketplace community member" then a branch is made to decision operation 262.

At decision operation 254, the processing module 41 determines whether disclosure to a "favourite friend" is enabled. In the present example, the processing module 41 may utilize user authorization information 87 associated with the second user and the bid list. If the second user has enabled disclosure then a branch is made to operation 256. Otherwise a branch is made to decision operation 258.

At operation 256, the processing module 41 retrieves item filter information 89 and item disclosure information 67 associated with the "favourite friend" relationship for the bid list as configured by the second user.

At decision operation 258, the processing module 41 determines whether disclosure of the requested list to a "friend" is enabled. In the present example, the processing module 41 may utilize the user authorization information 87 associated with the second user and the bid list. If the second user has enabled disclosure then a branch is made to operation 260. Otherwise a branch is made to decision operation 262.

At operation 260, the processing module 41 retrieves item filter information 89 and item disclosure information 67 associated with the "friend" relationship for the bid list as configured by the second user.

At decision operation 262, the processing module 41 determines whether disclosure of the requested list to a "marketplace community member" is enabled. In the present example, the processing module 41 may utilize user the authorization information 63 associated with the second user and the bid list. If the second user has enabled disclosure then a branch is made to operation 260. Otherwise a branch is made to decision operation 262.

At operation 266, the processing module 41 retrieves item filter information 89 and item disclosure information 67 associated with the "marketplace community member" relationship for the bid list as configured by the second user. At operation 264, the processing module 41 registers no disclosure of the requested list.

Figure 10:
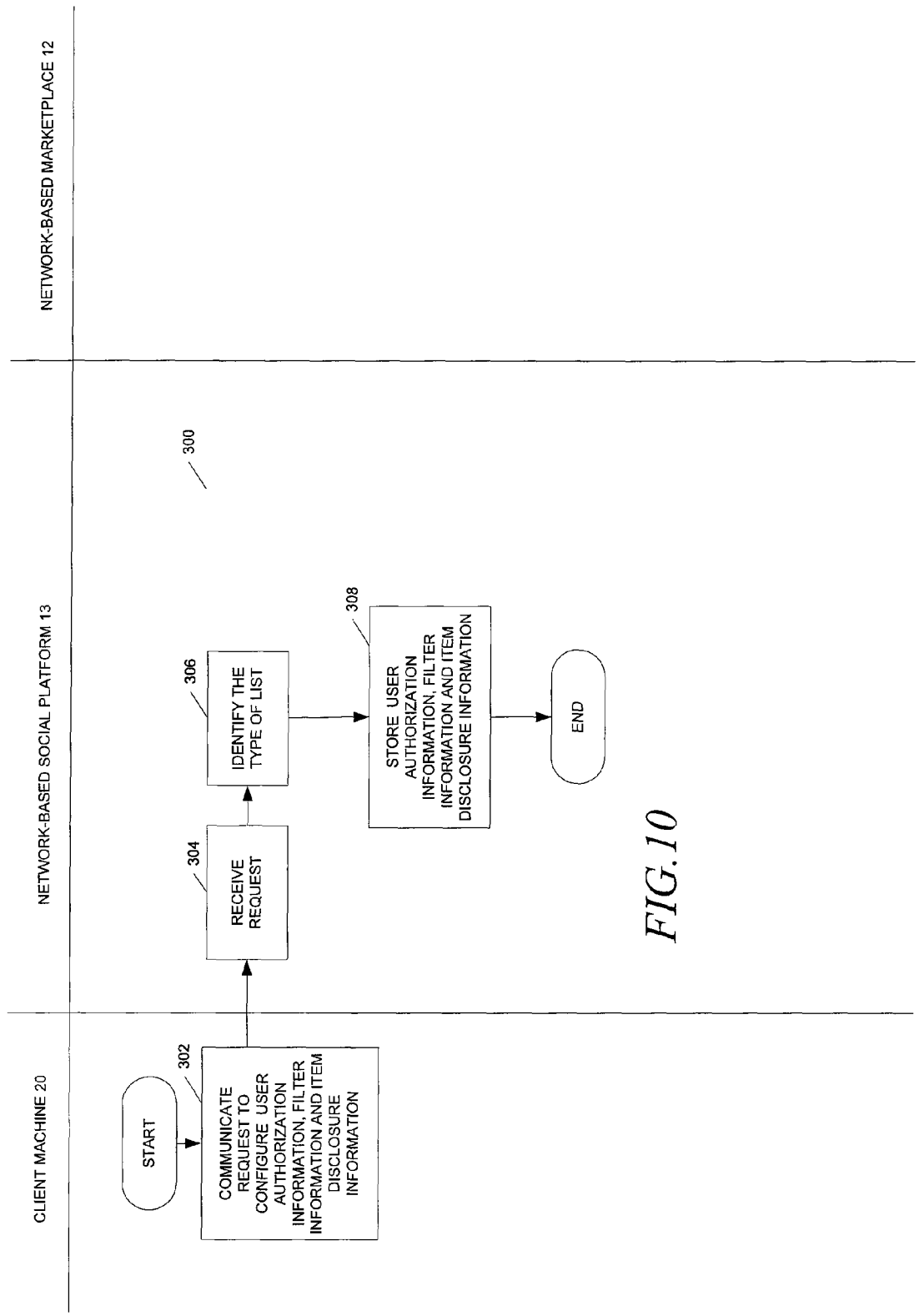
FIG. 10 is a block diagram illustrating a method, according to an embodiment, to receive control information for viewing a list.

FIG. 10 is a block diagram illustrating a method 300, according to an embodiment, to receive control information for viewing a list. In one embodiment, the control information may include user authorization information 87, item filter information 89 and item disclosure information 91. Illustrated on the right may be operations performed on the network-based marketplace 12. Illustrated in the middle may be operations performed on the network-based social platform 13 and illustrated on the left may be operations performed on the client machine 20.

The method 300 may commence, at operation 302, with the client machine 302 communicating a request to store control information for a particular list (e.g., bid list, won list, watch list, etc.). For example, client machine 20 may have received the control information from a first user before communicating the control information to the network-based social platform 13. In one embodiment, the control information may specify the type and quantity of information on a particular list that may be viewed by other users according to predetermined relationships.

At operation 304, at the network-based social platform 13, the communication module 39 receives the request and at operation 306 the processing module 41 identifies the list according to the request. At operation 308, the processing module 41 stores the user authorization information 87, item filter information 65, and item disclosure information 67, as previously described, for the specified list.

Figure 11:
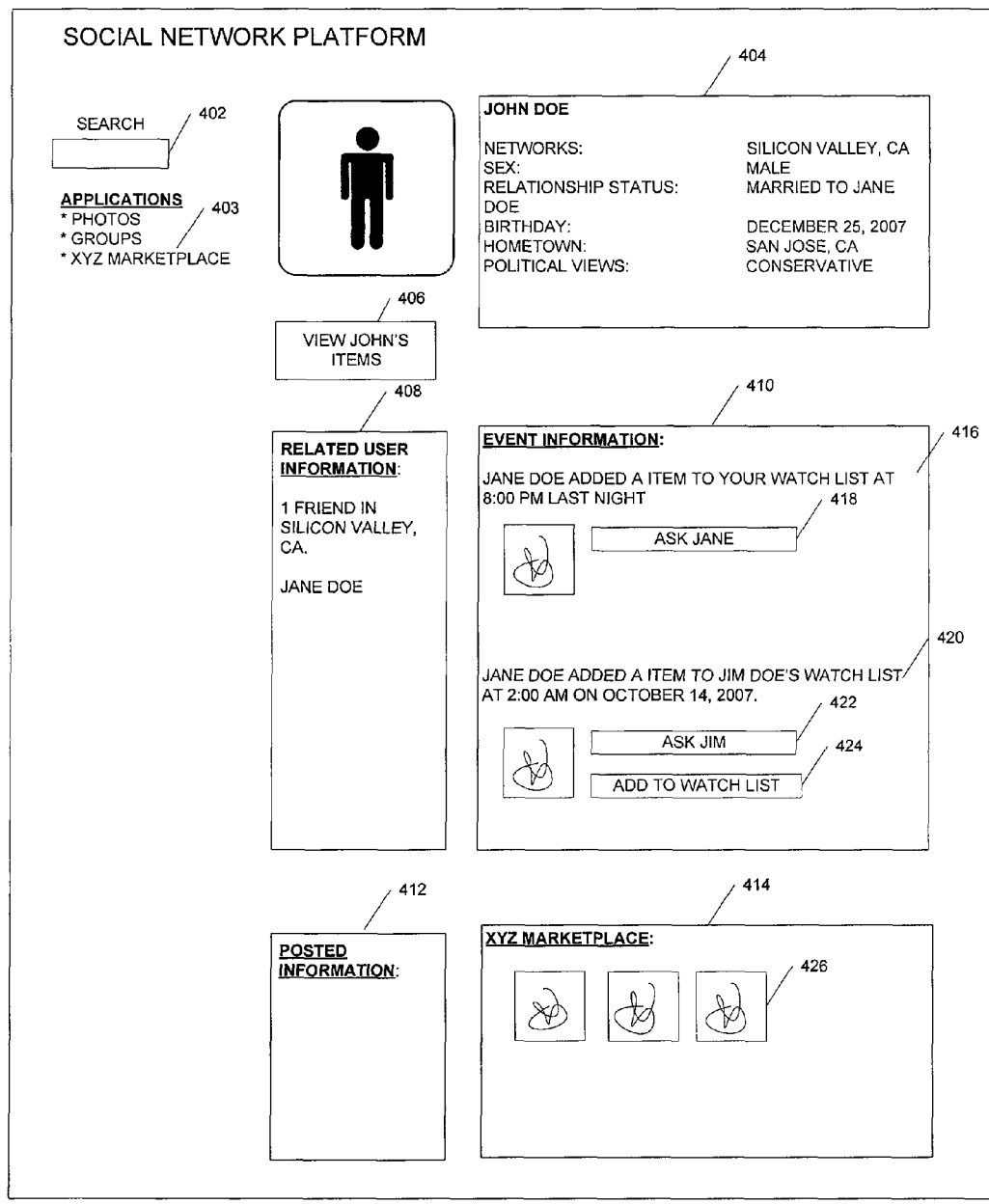
FIGS. 11-16 are diagrams illustrating user interfaces, according to an embodiment.

FIG. 11 is a diagram illustrating a user interface 400, according to an embodiment, of a user profile. The user profile may include user profile information 42 for the user featured by the user profile. The user profile may be displayed by the network-based social platform 13 to the user featured by the profile on the client machines 20, 22. A portion or all of the user profile information 42 may also be displayed to others users on the network-based social platform 13 according to a relationship with the user featured by the profile. In one embodiment, the quantity of information that may appear on the profile to a user viewing the profile may increase based on the relationship (e.g., "social networking platform user," "marketplace community member," "friend," "favorite friend," etc.). The user interface 400 may include an input box 402 to enter keywords that may be used to search the network-based social platform 13, a user interface element 403 to launch the XYZ marketplace application, user status information 404, a user interface element 406 to view lists of items associated with the user that owns the profile, related user information 408, event information 410, posted information 412, and application information 414.

The status information 404 includes information about the user. The event information 410 may chronicle actions performed by the user associated with the profile (e.g., John Doe) or actions performed by other users (e.g., "marketplace community member", "friend," "favorite friend," etc.) on the network-based social platform 13. The related user information 408 may include information about other users that are related (e.g., "friends") to the user featured by the profile. The event information 410 enables a user viewing the profile to quickly and easily see some of the most recent actions of the user that owns the profile or other users. The posted information 412 may include content posted by the user associated with the profile (e.g., "John Doe"). Accordingly, the posted information 412 enables the user to share content with other users on the network-based social platform 13. For example, posted content may include websites, blogs, videos, and songs that may be found on the Internet. Posted content may also include content from the network-based social platform 13 including profiles, photos, notes, groups, and events. In one embodiment content may be posted by copying and pasting a URL, selecting a share button located on user interfaces of the network-based social platform 13 or selecting a share button located on a third party server 40. The application information 414 is shown to include information for the application "XYZ Marketplace" The content of the application information 414 may be communicated from the network-based marketplace 12 based on an identifier associated with the user associated with the user profile. The application information 414 is shown to include user interface elements 426 (e.g., images) of items that may appear on any of the lists associated with the user (e.g., watch, bid, won, etc.). If a user other than the user associated with the profile is viewing the profile then the user interface elements 426 may be displayed based on the relationship of the viewing user with the user associated with the profile (e.g., "John Doe"), as previously described. In the present example, the user interface elements 426 may be associated with a minimal level of disclosure (e.g., teaser disclosure). In another example, the application information 414 may display a search box to search for listings of items. For example, the application information 414 may display a search box to search for listings of items responsive to determining no listings are on any of the lists associated with the user (e.g., watch, bid, won, etc.). The user interface elements 426 may be respectively selected by the user viewing the profile to display additional information (e.g., summary disclosure). In one embodiment, selection of the user interface element 426 may not do anything (e.g., teaser disclosure).

Figure 12:
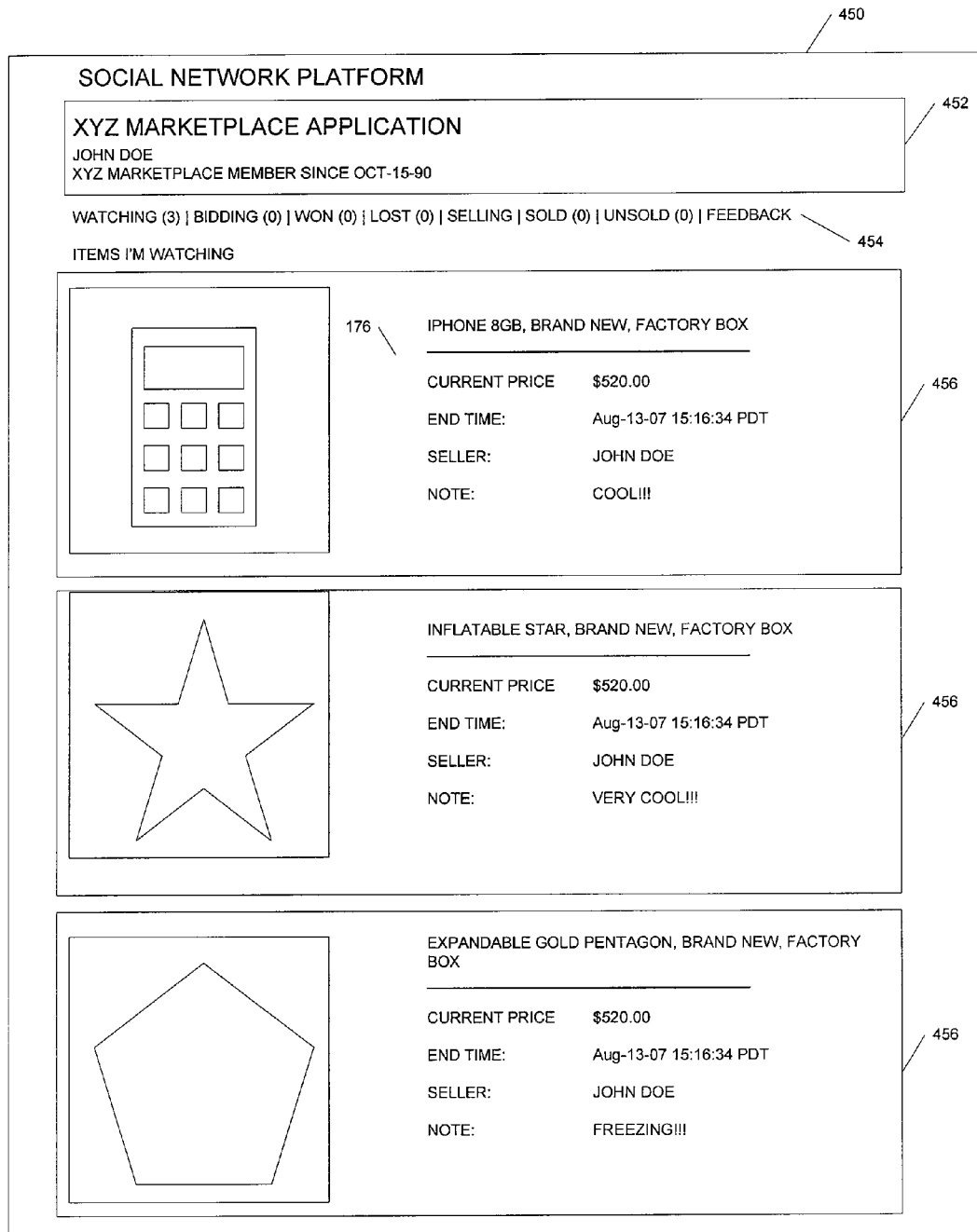

FIG. 12 is a diagram illustrating a user interface 450, according to an embodiment, to view a watch list of a user. For example, the user interface 450 is displayed to a "John Doe" and the watch list is owned by "John Doe." The watch list includes user interface elements 452 that identities the viewing user (e.g., John Doe), user interface elements 454 that may be respectively selected to view the named lists (e.g., bidding, won, etc.) of items, and listings 456 of items offered for sale on a network-based marketplace 12. The listings 456 of items include item information 176 descriptive of the item for sale on the network based marketplace 12.

Figure 13:
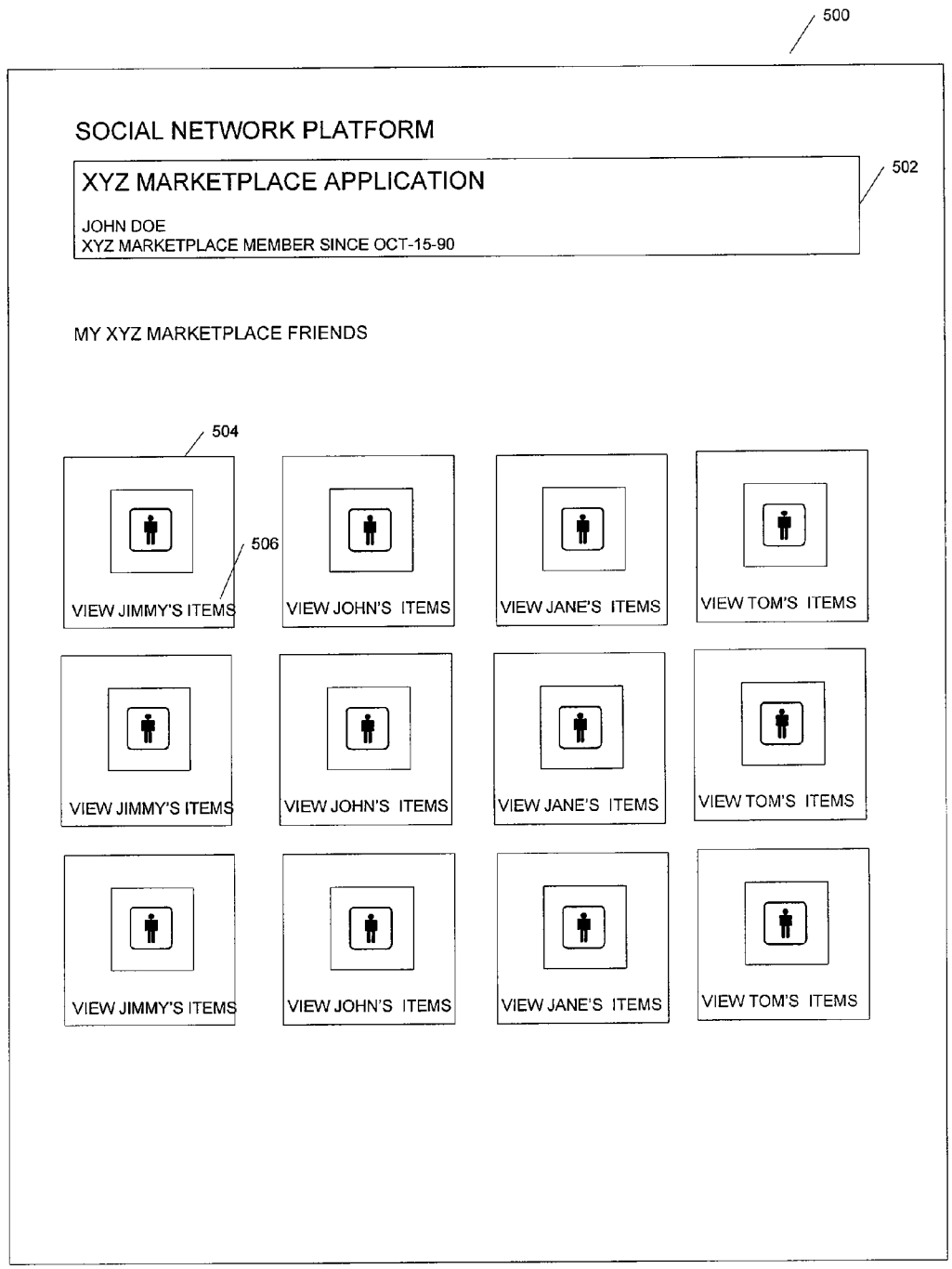

FIG. 13 is diagram illustrating a user interface 500, according to an embodiment, to view shopping information. The user interface 500 may be displayed by the network based social platform 13 and includes a user interface element 502 that identifies the logged in user (e.g., username, John Doe, associated with username and password provided at login) and multiple interface elements 504 each of which is associated with a user that may be a "friend" or "favorite friend" of the viewing user. Each user interface element 504 includes a user interface element 506 that may be selected to view the lists of items (e.g., watch, bid, etc.) of the user featured by the user interface element 504.

Figure 14:
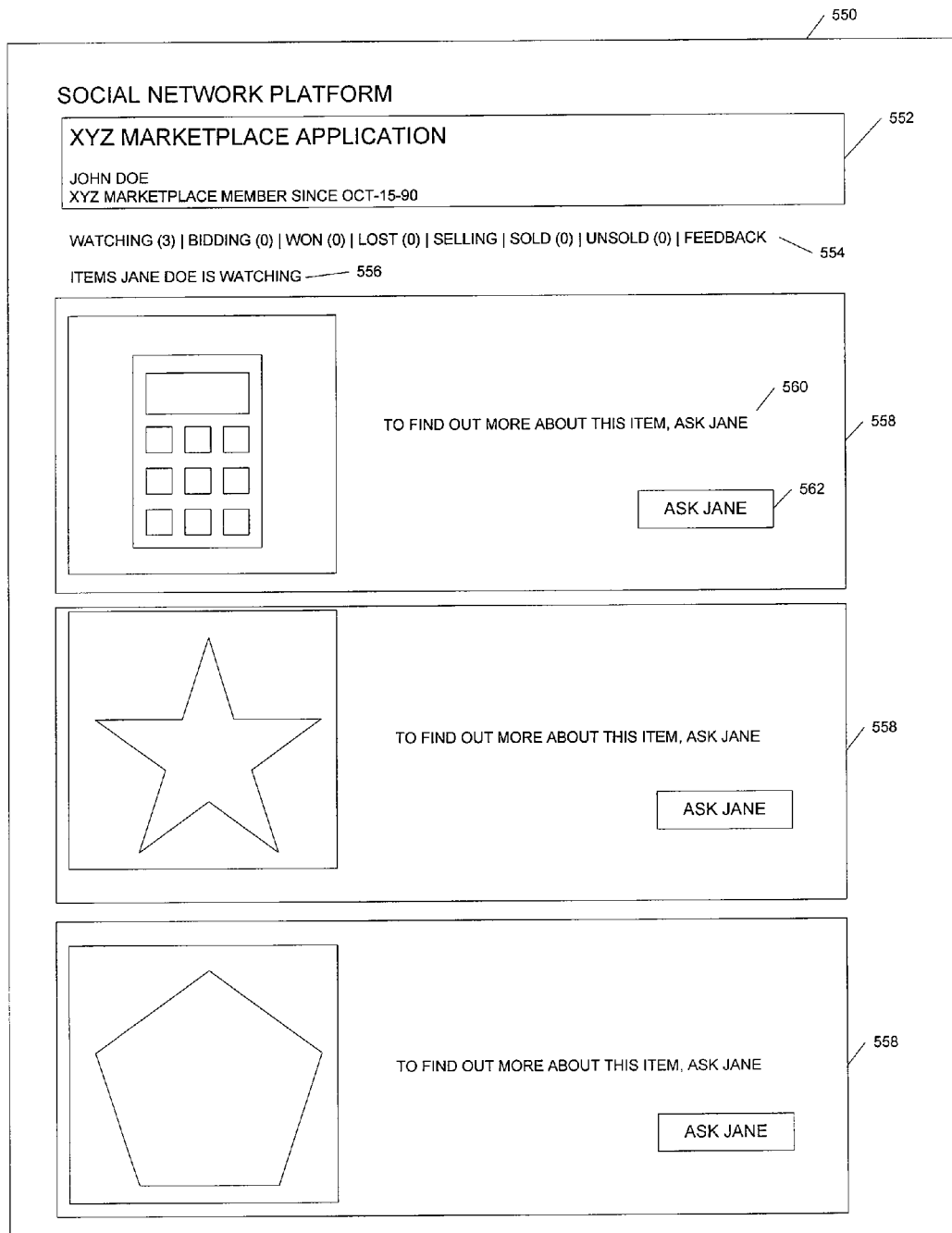

FIG. 14 is diagram illustrating a user interface 550, according to an embodiment, to view a watch list of another user. For example, the user interface 550 is displayed to a "John Doe" (e.g., logged in user) and the watch list is owned by "Jane Doe." The user interface 550 may be displayed by the network based social platform 13 and includes listings 558 of items each of which include a text string 560 and a selectable user interface element 562. As shown, the listing 558 includes limited item information 176 (e.g., image) because the user that owns the watch list (e.g., "Jane Doe") has configured a "teaser disclosure" setting for the list based on a relationship with the user that is viewing the watch list. In another embodiment, the user may disclose additional item information 176 (e.g., description of item, highest bid, auction end time, etc.) or no item information 176. If the user configures no item information 176 then user interface 500 may include a message indicating that the user is not sharing the watch list. The user interface element 562 may be selected to communicate a message to the owner of the watch list (e.g., "Jane Doe"). The message may identify the listing of the item and a message from the user.

Figure 15:
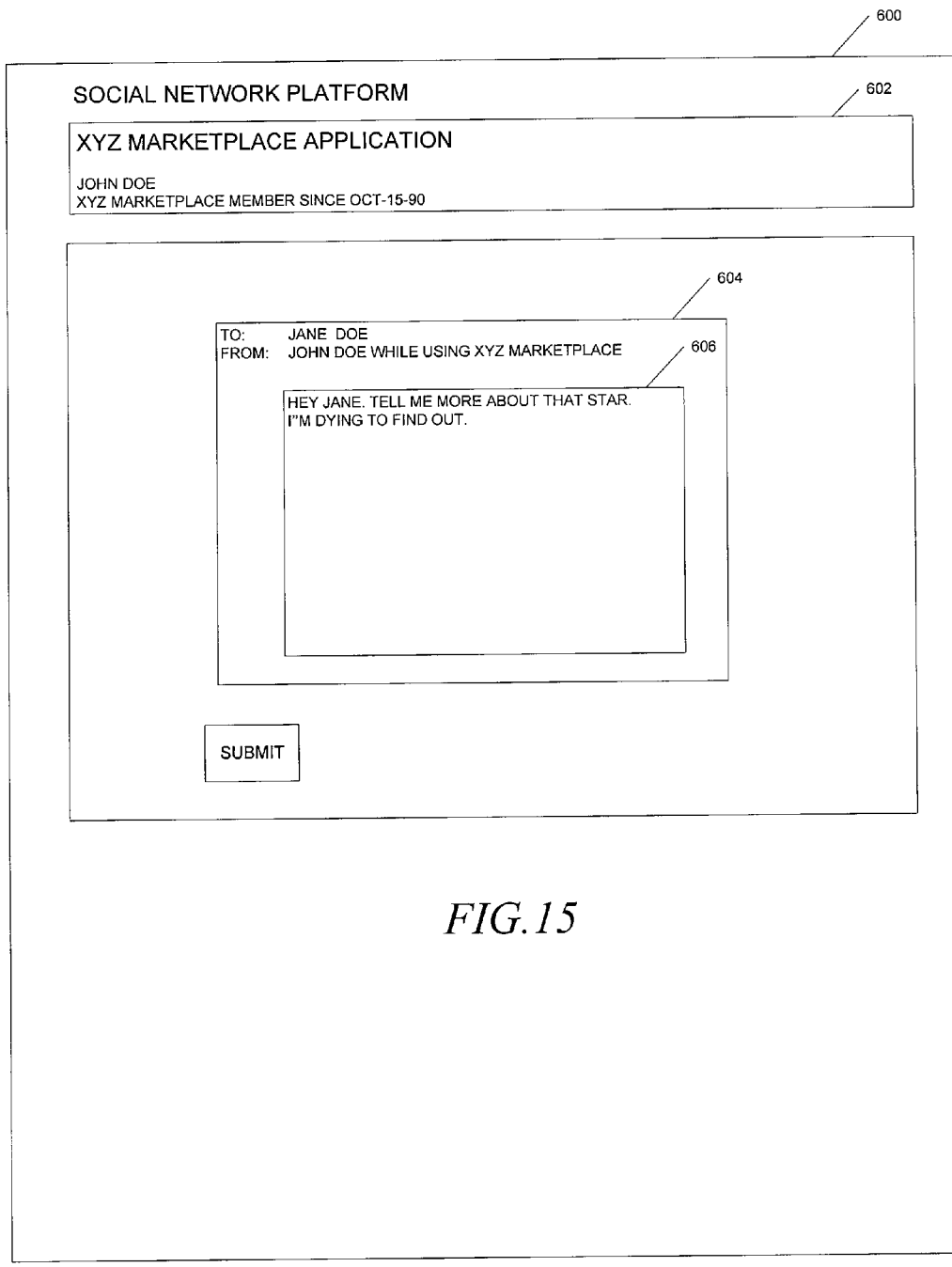

FIG. 15 is diagram illustrating a user interface 600, according to an embodiment, to communicate a message. For example, the user interface 600 is displayed to a "John Doe" who is communicating a message to a "Jane Doe." The user interface 660 may be displayed by the network based social platform 13 and includes user interface elements 602 that identifies the logged in user (e.g., John Doe) and a message 604 that includes an input box 606. The message may be automatically addressed as "From" the viewing user and "To" another user whom the viewing user identified on a previous user interface.

Figure 16:
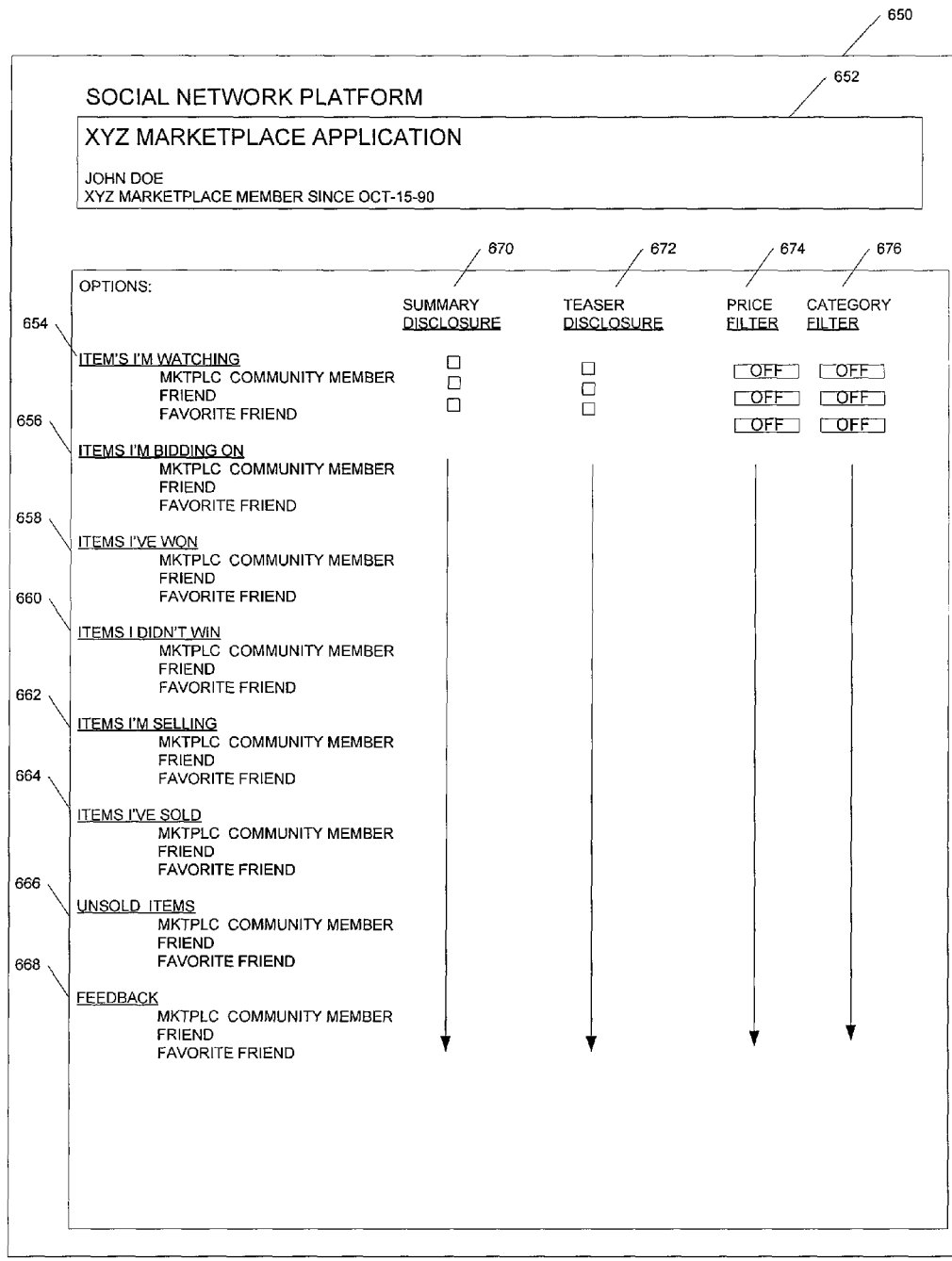

FIG. 16 is diagram illustrating a user interface 650, according to an embodiment, to receive configurable parameters. The user interface 650 may be displayed by the network based social platform 13 and used to receive configurable parameters that are selected by the viewing user. The configurable parameters are related to the type and quantity of information disclosed to users on the network-based social platform 13. The user interface 650 and includes user interface elements 652 that identifies the logged in user (e.g., John Doe). Accordingly, the received parameters are applicable to disclosure of information for the lists owned by the viewing user and feedback on the viewing user. The user interface 650 enables selection of configurable parameters by the viewing user on the network-based social platform 13 according to lists owned by the viewing user and relationships with other users on the network-based social platform 13. Specifically, the relationships may include "community marketplace community member," "friend," and "favourite friend." The lists include a watch list 654, a bid list 656, a won list 658, a lost list 660, a selling list 662, a sold list 664, and an unsold list 666. The user interface 650 further enables selection of configurable parameters for feedback left by other users on the network-based marketplace 12 for the viewing user. Feedback represents a users permanent reputation on the network-based marketplace 12. Feedback (e.g., feedback records) may include comments and ratings left by other network-based marketplace 12 users from whom the viewing user has bought items and/or to whom the viewing user has sold items.

According to one embodiment, the user interface 650 is shown to include a summary disclosure parameter 670, a teaser disclosure parameter 672, a price filter 674, and a category filter 676. A set of parameters and filters may be configured for each list/feedback according to a relationship. The summary disclosure 670 and teaser disclosure 672 may be mutually exclusive. Accordingly, the user may select one or the other but not both. Selection of the summary disclosure 670 may cause maximum amount of item information 176 to be disclosed (e.g., Title, Description, reserve price, highest bid, purchase price, graphic, picture, etc.) and selection of the teaser disclosure 672 may cause a minimum amount of item information 176 to be disclosed. For example, an image, graphic or picture may be disclosed without additional item information 176. Not selecting the summary disclosure 670 or the teaser disclosure 672 may prevents disclosure of item information 176. The price filter 674 may be configured "OFF" or to a specific price range. The price filter may include a pull-down menu with price ranges (e.g., 0-$0.99, $1.00-$9.99, $10.00-$99.00, etc.) that are displayed for selection by the user. For example, selection of a price range 0-$0.99 may cause display of listings of items with a minimum bid or selling price within the price range. The category filter may be configured "OFF" or to a specific category. For example, the category filter 676 may include a pull-down menu with categories (e.g., toys, books, automobiles) that are displayed for selection by the user. For example, selection of a category "toys" may cause display of listings of items in the category "toys" on the network-based marketplace 12. Other embodiments may enable selection of the above described options according to other combinations of the identified groups of users and the identified groups of listings.

Figure 17:
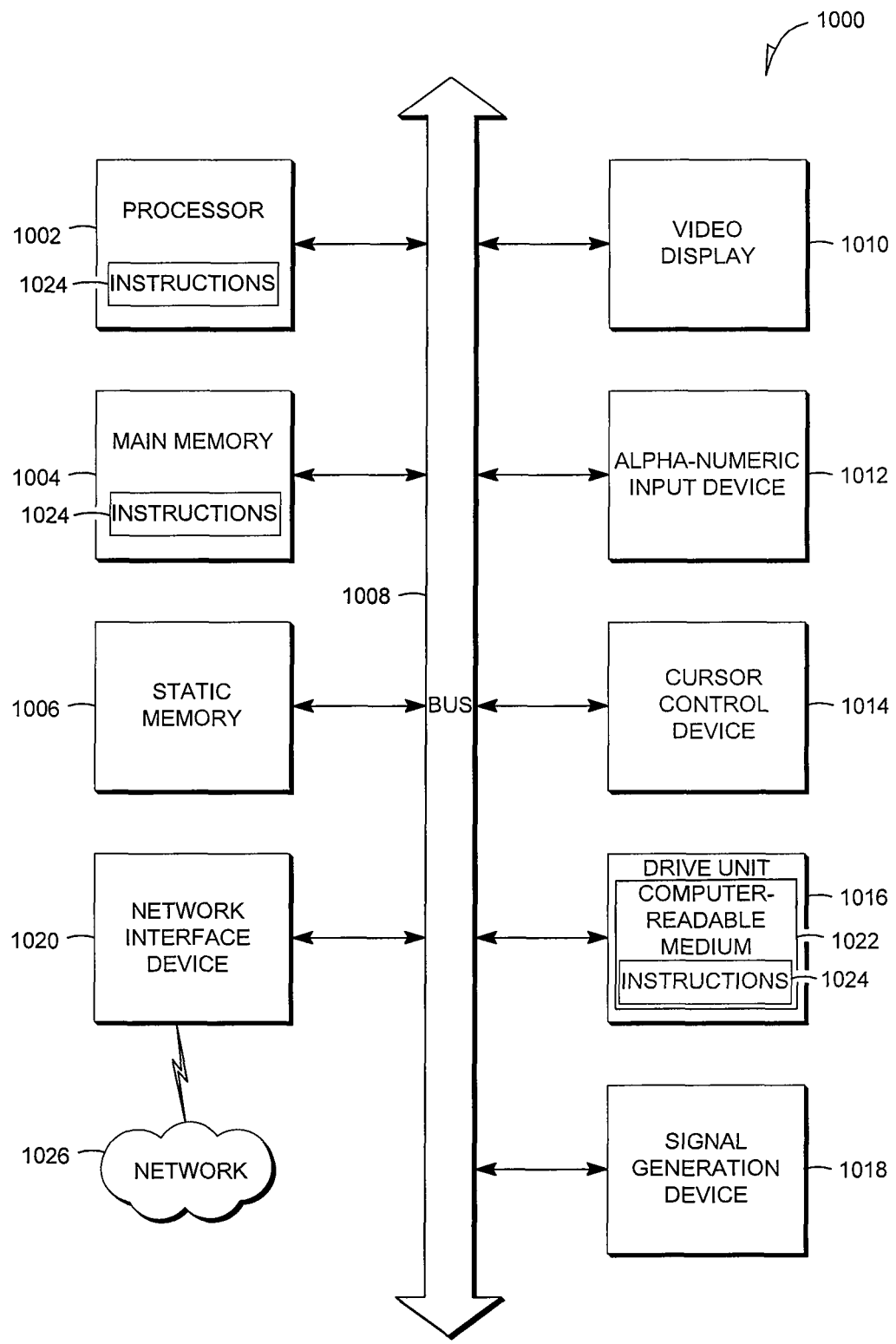
FIG. 17 is a block diagram of a machine, according to an example embodiment, including instructions to perform any one or more of the methodologies described herein.

FIG. 17 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 14 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules, or processes that govern the software application as a whole. A third, storage tier, may be a persistent storage medium or, non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Modules, Components and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled.

Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Component Design

Some example embodiments may include the above illustrated tiers, and processes or operations that make them up, as being written as one or more software components. Common too many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the OSI model, or TCP/IP protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

receiving, from a first user device operated by a first user, control information for managing access to a list, the list being generated by the first user and including at least one item offered for sale on a network-based commerce server, the control information including a preference of the first user in disclosing item information describing the at least one item on the list;

receiving, from a second user device operated by a second user, a request-to view the list generated by the first user;

determining, using a processor of a machine, the second user is authorized to view the list based on a relationship between the first user and the second user, the determining that the second user is authorized to view the list comprising:

determining a type of relationship between the first user and the second user on a network-based social platform, and determining that the first user has enabled disclosure of the list to users having the type of relationship between the first user and the second user; and in response to determining the second user is authorized to view the list, communicating the list to the second user device in accordance with the control information.

2. The method of claim 1, wherein the network-based commerce server is configured to provide marketplace functions and corresponds to a first website and wherein the request to view the list is received at a network-based social platform configured to provide social networking functions and corresponding to a second website.

3. The method of claim 1, wherein the receiving a request to view the list generated by the first user includes receiving a query, from the second user, identifying the first user and being submitted via a search box of a graphical user interface.

4. The method of claim 1, wherein the item information comprises at least one of a title, a description, photograph, or a purchase price of the at least one item listed for sale.

5. The method of claim 1, wherein the control information further includes a preference of the first user for not disclosing an item on the list to the second user.

6. The method of claim 1, wherein the control information includes a preference of the first user regarding a quantity of item information that is disclosed for a specific item in the list.

7. The method of claim 1, further comprising storing the control information in a user profile corresponding to the first user.

8. The method of claim 1, wherein communicating the list to the second user includes displaying item information for a first item of the list based on the control information.

9. The method of claim 1, wherein communicating further includes providing the second user an ability to communicate with the first user concerning the first item.

10. A system comprising:
a processor;
a communication module to receive, from a first user device operated by a first user, control information for managing access to a list, the list being generated by the first user and including at least one item listed for sale at a network-based commerce server, the control information including a preference of the first user in disclosing item information describing the at least one item on the list, the communication module further to receive a request, from a second device operated by a second user, a request to view the list generated by the first user; and
a processing module to determine, using the processor, that the second user is authorized to view the list generated by the first user based on a relationship between the first user and the second user, the communication module to communicate the list to the second user in accordance with the control information, the determining that the second user is authorized to view the list comprising:
determining a type of relationship between the first user and the second user on a network-based social platform, and
determining that the first user has enabled disclosure of the list to users having the type of relationship between the first user and the second user.

11. The system of claim 10, wherein the network-based commerce server corresponds to a first website and wherein the request to view the list is received at a network-based social platform configured to provide social networking functions and corresponding to a second website.

12. The system of claim 11, wherein the network-based commerce is configured to provide marketplace functions.

13. The system of claim 10, wherein the communication module is further to receive a query, from the second user device, identifying the first user and being submitted via a search box of a graphical user interface displayed on the second user device.

14. The system of claim 10, wherein the item information comprises at least one of a title, a description, photograph, or a purchase price of the at least one item listed for sale.

15. The system of claim 10, wherein the control information further includes a preference of the first user for not disclosing an item on the list to the second user.

16. The system of claim 10, wherein the control information includes a preference of the first user regarding a quantity of item information that is disclosed for a specific item in the list.

17. The system of claim 10, wherein communicating the list to the second user device includes displaying item information for a first item of the list on the second user device based on the control information.

18. A non-transitory machine-readable storage medium embodying instructions that, when executed by a machine, cause the machine to perform operations comprising:
receiving, from a first user device operated by a first user, control information for managing access to a list, the list being generated by the first user and including at least one item listed for sale at a network-based commerce server, the control information including a preference of the first user in disclosing item information describing the at least one item on the list;
receiving, from a second user device operated by a second user, a request to view the list generated by the first user;
determining that the second user is authorized to view the list based on a relationship between the first user and the second user, the determining that the second user is authorized to view the list comprising:
determining a type of relationship between the first user and the second user on a network-based social platform, and
determining that the first user has enabled disclosure of the list to users having the type of relationship between the first user and the second user; and
in response to determining the second user is authorized to view the list, communicating the list to the second user device in accordance with the control information.

* * * * *